United States Patent
Muppala et al.

(10) Patent No.: US 11,258,718 B2
(45) Date of Patent: Feb. 22, 2022

(54) CONTEXT-AWARE RATE LIMITING

(71) Applicant: VMware, Inc., Palo Alto, CA (US)

(72) Inventors: Suresh Muppala, Palo Alto, CA (US); Nafisa Mandliwala, Santa Clara, CA (US); Sirisha Myneni, Santa Clara, CA (US); Venkatakrishnan Rajagopalan, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 143 days.

(21) Appl. No.: 16/686,922

(22) Filed: Nov. 18, 2019

(65) Prior Publication Data

US 2021/0152480 A1 May 20, 2021

(51) Int. Cl.
| | | |
|---|---|---|
| *H04L 12/851* | (2013.01) |
| *G06F 9/455* | (2018.01) |
| *H04L 12/861* | (2013.01) |
| *H04L 12/863* | (2013.01) |
| *H04L 47/2441* | (2022.01) |
| *H04L 49/90* | (2022.01) |
| *H04L 47/62* | (2022.01) |

(52) U.S. Cl.
CPC ...... *H04L 47/2441* (2013.01); *G06F 9/45558* (2013.01); *H04L 47/6215* (2013.01); *H04L 49/90* (2013.01); *G06F 2009/45595* (2013.01)

(58) Field of Classification Search
CPC . H04L 47/2441; H04L 49/90; H04L 47/6215; G06F 9/45558; G06F 2009/45595
See application file for complete search history.

(56) References Cited

U.S. PATENT DOCUMENTS

| | | | | |
|---|---|---|---|---|
| 10,097,474 B1* | 10/2018 | Kabbani | ................. | H04L 47/41 |
| 10,469,404 B1* | 11/2019 | Mao | ....................... | H04L 67/16 |
| 2010/0128605 A1* | 5/2010 | Chavan | ................. | H04L 47/263 370/230.1 |
| 2014/0153388 A1* | 6/2014 | Webb | ...................... | H04L 47/20 370/230 |
| 2014/0330888 A1* | 11/2014 | Dave | ...................... | H04L 67/10 709/203 |
| 2015/0040121 A1* | 2/2015 | Barabash | ............ | H04L 41/5003 718/1 |
| 2015/0134830 A1* | 5/2015 | Popa | ..................... | H04L 47/528 709/226 |

(Continued)

*Primary Examiner* — Habte Mered
(74) *Attorney, Agent, or Firm* — Patterson & Sheridan, LLP

(57) ABSTRACT

The disclosure provides an approach for rate limiting packets in a network. Embodiments include receiving, by a rate limiting engine running on a host machine, a network event related to a virtual computing instance running on the host machine, the network event comprising flow information about a network flow. Embodiments include receiving, by the rate limiting engine, context information corresponding to the network flow, wherein the context information comprises one or more of a user characteristic or an application characteristic. Embodiments include determining, by the rate limiting engine, a priority for the network flow by applying a rate limiting policy to the flow information and the context information. Embodiments include providing, by the rate limiting engine, the priority for the network flow to a multiplexer for use in rate limiting the network flow.

17 Claims, 4 Drawing Sheets

(56) References Cited

U.S. PATENT DOCUMENTS

| | | | |
|---|---|---|---|
| 2016/0156538 A1* | 6/2016 | Yalagandula | G06F 9/5038 709/224 |
| 2018/0062944 A1* | 3/2018 | Altman | H04L 43/0817 |
| 2019/0052532 A1* | 2/2019 | Chen | H04L 43/0876 |
| 2019/0081899 A1* | 3/2019 | Mundkur | G06F 15/76 |
| 2019/0235894 A1* | 8/2019 | Wang | G06F 9/5027 |
| 2020/0028788 A1* | 1/2020 | Chen | H04L 41/0896 |
| 2020/0099628 A1* | 3/2020 | Parikh | H04L 47/52 |

* cited by examiner

CONTEXT-AWARE RATE LIMITING

BACKGROUND

Data centers generally include computing devices such as servers connected to form a network. For instance host devices in a data center may run virtual computing instances (VCIs) that exchange network traffic with one another and with other endpoints (e.g., servers) outside of the data center. Computing entities (e.g., physical computing devices, VCIs, etc.) may send requests and responses (e.g., in client-server architectures), such as via application programming interfaces (APIs) provided by software applications running on the computing entities.

As the numbers of computing devices in data centers increase, the amount of network traffic increases. Large amounts of resource usage can result in decreased performance throughout the data center. As such, there is a need in the art for techniques that improve performance of computing entities in data centers.

SUMMARY

Embodiments provide a method of rate limiting packets in a network. Embodiments include: receiving, by a rate limiting engine running on a host machine, a network event related to a virtual computing instance (VCI) running on the host machine, the network event comprising flow information about a network flow; receiving, by the rate limiting engine, context information corresponding to the network flow, wherein the context information comprises one or more of: a user characteristic; or an application characteristic; determining, by the rate limiting engine, a priority for the network flow by applying a rate limiting policy to the flow information and the context information; and providing, by the rate limiting engine, the priority for the network flow to a multiplexer for use in rate limiting the network flow.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
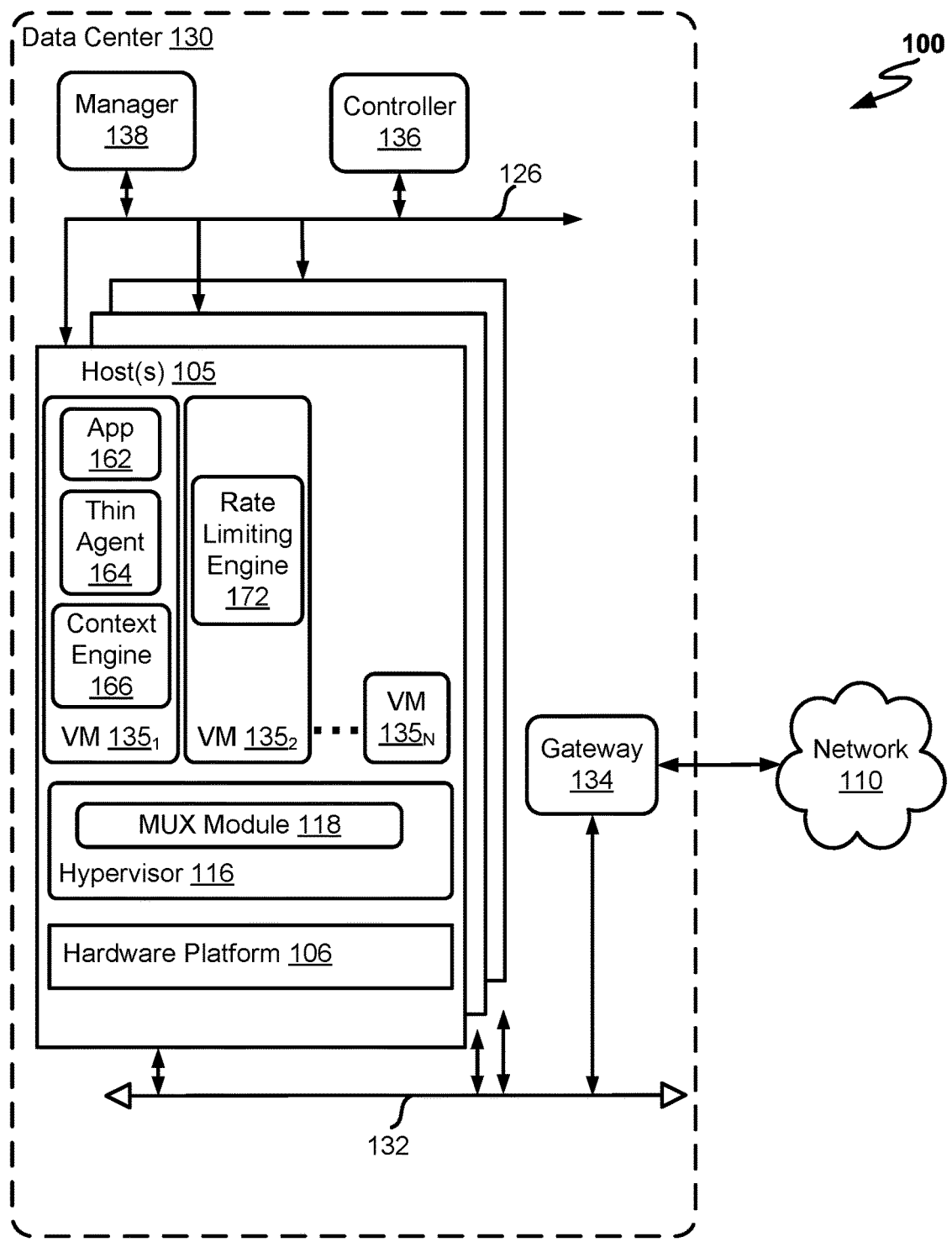
FIG. 1 depicts a block diagram of physical and virtual components of a network in which one or more embodiments of the present disclosure may be utilized.

The present disclosure provides an approach for context-based rate limiting in order to improve performance of computing entities in a network. In certain embodiments, traffic between endpoints in a network is monitored and rate-limited in the data path based on context associated with the traffic, such as application context and user context. For example, a virtual computing instance (VCI) such as a first virtual machine (VM) running on a host in a data center may send a request for data to another VCI, such as a second VM, running on the same host or a different host. In an example, a thin agent running within the first VM captures the request as a network event. The thin agent may gather context related to the network event, such as through interaction with a context engine running in the first VM that performs introspection into the first VM. In some embodiments, the context includes information about the application that submitted the request (e.g., a process identifier) and the user of the application (e.g., a user identifier and/or group identifiers of groups to which the user belongs, such as active directory identifiers), and is gathered through introspection into a guest operating system (OS) of the first VM. The request generally includes flow information about a network flow to which the request corresponds, such as a five-tuple identifier (i.e., source port and IP address, destination port and IP address, and protocol) of the requested network connection.

In some embodiments, the thin agent provides the context along with the network event, including the flow information, to a multiplexer (MUX). The MUX then provides the flow information and the context to a rate limiting engine, which may be within the MUX, running separately on the host, running within a VCI on the host, or the like. The rate limiting engine applies rate limiting policies to the flow information and the context in order to assign a priority to the flow. In an example, rate limiting policies are received by the rate limiting engine from a management plane via a control plane in the network. The rate limiting policies generally specify rules for assigning priorities to flows, and may be based on application information, user information, and the like. In one example, a rate limiting policy indicates that flows corresponding to users in an "executive" group are to be given a higher priority than flows corresponding to users in a "support" group. In another example, a rate limiting policy may specify that secure shell (SSH) traffic is to be given a higher priority than hypertext transfer protocol (HTTP) traffic.

Once the rate limiting engine assigns a priority to the flow, the flow is rate limited based on the priority. In some embodiments, the rate limiting engine performs the rate limiting, while in other embodiments the rate limiting engine provides the priority to the MUX, and the MUX performs the rate limiting. In still other embodiments, the priority is provided to another entity, such as a virtual switch, which performs the rate limiting. Rate limiting may be performed, for example, by assigning packets to different queues according to priority. For example, if the request has a priority of 1, then it may be added to a "priority 1" queue, from which packets are generally transmitted before packets in other queues. In other embodiments, rate limiting is performed by delaying connection establishments. For example, a lower-priority connection establishment may be delayed until after a higher-priority connection establishment has completed or until a given amount of time has elapsed.

In some embodiments, requests are rate limited in order to avoid resource usage that would be associated with rate limiting responses. Requests are sometimes significantly smaller in size than responses. For example, a request for video data is much smaller than the video data that is sent in response. Rate limiting the response in such cases may involve buffering large amounts of data, thereby requiring significant resource usage. As such, certain embodiments of the present disclosure involve rate limiting requests in order to achieve the result of rate limiting the responses. For example, if a flow is assigned a relatively low priority based on rate limiting policies and the flow includes requests for large amounts of data, then the requests may be rate limited in order to slow the rate at which the large amounts of data are sent in response, even though the requests themselves may not require a significant amount of resources to send. In some embodiments, responses may additionally or alternatively be rate-limited, such as when responses include data that is below a size threshold.

Figure 2:
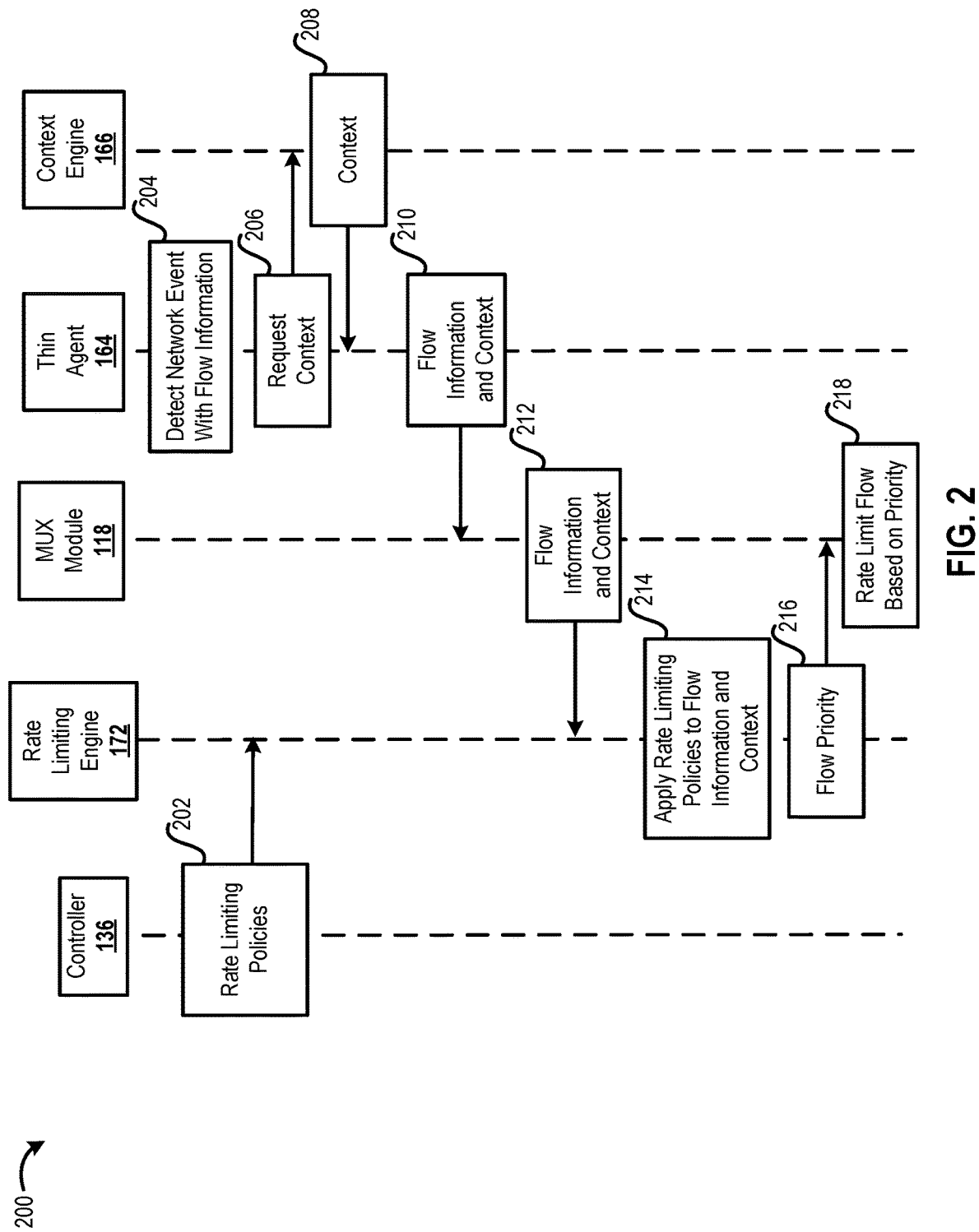
FIG. 2 depicts a block diagram of an example exchange of messages between network components, according to an embodiment.

FIG. 1 is a block diagram depicting physical and virtual components of a networking environment 100, in which one or more embodiments of the present disclosure may be utilized. FIG. 1 is described in conjunction with FIG. 2, which illustrates an example 200 of an exchange of messages between network components, according to an embodiment.

Networking environment 100 includes a data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual machines 135₁ to 135N (collectively referred to as VMs 135 and individually referred to as VM 135) that run concurrently on the same host. Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VMs 135 may be replaced with containers that run on host 105 without the use of a hypervisor.

Hypervisor 116 includes a MUX module 118, which may perform multiplexing operations with respect to VMs 135. In some embodiments, MUX module 118 receives information related to network events from VMs 135 and performs rate limiting, in some embodiments in conjunction with rate limiting engine 172.

Gateway 134 provides VMs 135 and other components in data center 130 with connectivity to network 110, and is used to communicate with destinations (not shown) external to data center 130. Gateway 134 may be a virtual computing instance, a physical device, or a software module running within host 105.

Controller 136 generally represents a control plane that manages configuration of appliances 120 and 122 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 generally represents a management plane comprising one or more computing devices responsible for receiving logical network configuration inputs, such as from a network administrator, defining one or more endpoints (e.g., VMs and/or containers) and the connections between the endpoints, as well as rules governing communications between various endpoints. For example, manager 138 may receive rate limiting policies from a network administrator, and may send the rate limiting policies as network configuration data to controller 136 for distribution to endpoints on hosts 105 via management network 126.

VM 135₁ includes an app 162, which may, in some embodiments, be a client or server application that requests and/or responds to requests for data. VM 135₁ further includes a thin agent 164, which generally represents an in-guest agent that corresponds to a rate limiting system and/or security system external to VM 135₁. In particular, thin agent 164 is an agent of MUX module 118 and/or rate limiting engine 172. Thin agent 164 can collect information about VM 135₁, such as via context engine 166. In particular, thin agent 164 is configured to intercept network events (e.g., network pre-connect, connect, and disconnect events), file events (e.g., file access events), system events, and the like that are generated due to calls made by applications, such as app 162, running in VM 135₁ and deliver information (e.g., a type of the event, network addresses associated with the event, file names associated with the event, file locations associated with the event, etc.) about such events to MUX module 118 as further discussed herein.

In an example, an operating system running on VM 135₁ provides libraries that deliver such information about such events generated based on calls made by applications running on the operating system to a registered client. Accordingly, thin agent 164 is registered with the operating system and receives such events occurring on VM 135₁ from the operating system.

Context engine 166 generally performs operations related to retrieving context information from VM 135₁, such as application and user information. In some embodiments, context engine 166 performs introspection into the guest OS running on VM 135₁ in order to retrieve context information. For example, context engine 166 may register hooks (e.g., callbacks) with one or more modules (e.g., kernel-space modules or user-space modules) in the guest OS of VM 135₁ in order to retrieve context information related to network events.

It is noted that the components depicted in VM 135₁ may be representative of components of other VMs 135 as well.

VM 135₂ includes rate limiting engine 172, which generally performs operations related to context-based rate limiting in conjunction with MUX module 118. For example, rate limiting engine 172 may receive rate limiting policies from manager 138, such as via controller 136, and may apply the rate limiting policies to network events and associated context information in order to determine priorities for flows.

In example call flow 200, controller 136 provides rate limiting policies at step 202 to rate limiting engine 172. In some embodiments, controller 136 receives the rate limiting policies from manager 138 and pushes the rate limiting policies to all VMs 135 to which the policies relate. Rate limiting policies generally include rules that specify how priorities are to be assigned to flows, and are generally based on flow information and/or context information. In an example, a rate limiting policy may specify that flows relating to a certain web browser are to be given priority over flows relating to other applications. Some rate limiting policies may be based on a plurality of criteria, such as source and/or destination IP addresses, users, user groups, application attributes, type of data requested, size of data requested, and the like.

At step 204, thin agent 164 receives a network event, such as from the guest OS running on VM 135₁, with flow information. For example, the network event may be a pre-connect event triggered by a request for data by app 162. In an embodiment, app 162 is a client-side component of a client-server application, and requests video data from a server-side component that resides in a VM on a different host 105 than the host 105 on which VM 135₁ is located. The flow information may include a network event identifier, such as a five-tuple identifier of a network flow to which the network event corresponds. At step 206, thin agent 164 requests context for the network event from context engine 166, and at step 208, context engine 166 provides the context for the network event to thin agent 164. In an example, context engine 166 introspects into the guest OS of VM 135₁ to retrieve the context, which may include application information, user information, and the like.

At step 210, thin agent 164 provides the flow information and context to MUX module 118. At step 212, MUX module 118 provides the flow information and context to rate limiting engine 172. In alternative embodiments, rate limiting engine 172 is part of MUX module 118.

At step 214, rate limiting engine 172 applies rate limiting policies received at step 202 to the flow information and context in order to determine a priority for the flow. At step 216, rate limiting engine 172 provides the flow priority to MUX module 118. At step 218, MUX module 118 rate limits the flow based on the priority. In alternative embodiments, rate limiting engine 172 or another local or remote component, such as a virtual appliance, performs the rate limiting. Rate limiting may be accomplished by, for example, assigning packets from the flow to a given queue that corresponds to the priority. In another example, rate limiting is accomplished by delaying establishment of a connection for a time period or until the occurrence of another event, such as the completion of another flow. In one example, the flow includes requests for video data, and the flow is rate limited by limiting the rate at which the requests are sent in order to avoid resource usage associated with rate limiting the responses, thereby avoiding buffering large amounts of video data on the server side.

Example call flow 200 may apply to either client-side or server-side components of client-server applications, and rate limiting may be performed on either side or both sides.

In some embodiments, rate limiting is further based on real-time data regarding resource availability and/or congestion at sources and destinations of flows. For instance, a server-side component may send an indication to the MUX module that the server-side component is experiencing congestion, and requests from the client-side component to the server-side component may accordingly be rate-limited based on the indication.

Figure 3:
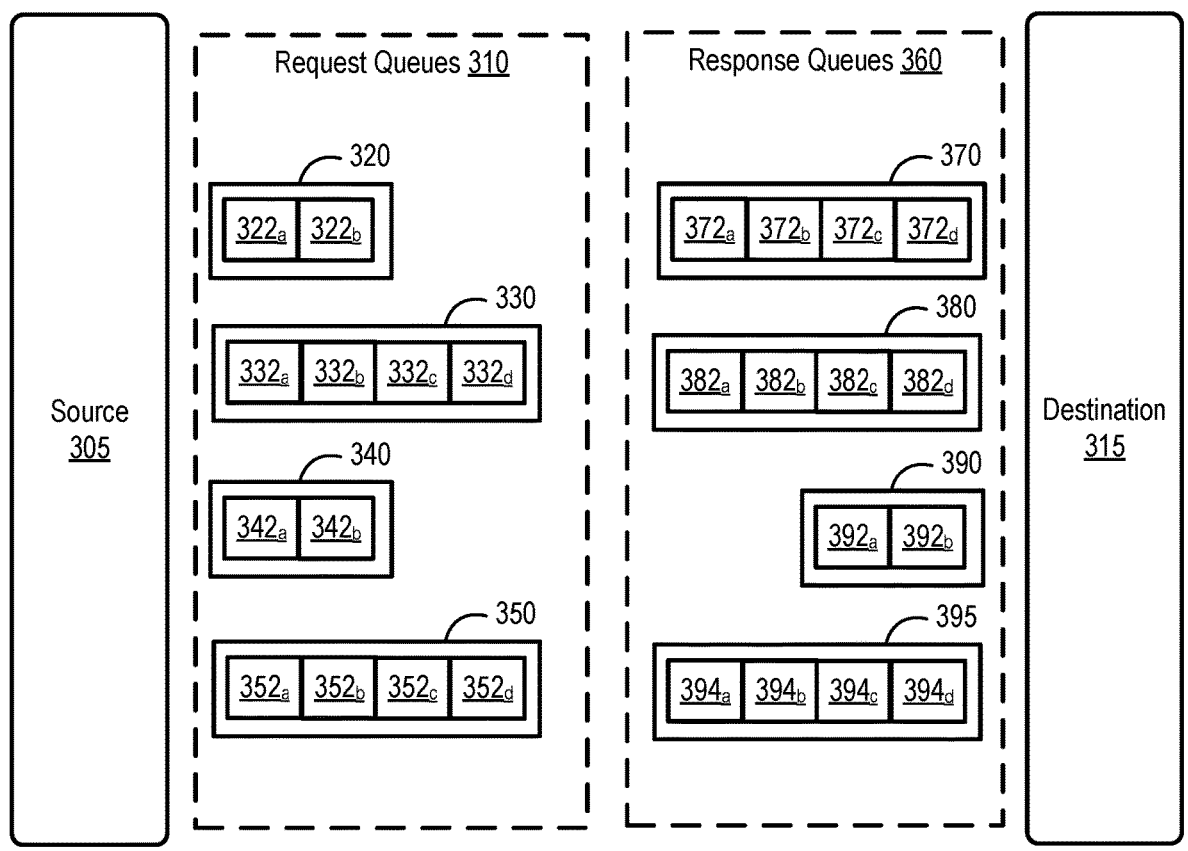
FIG. 3 depicts example queues for context-based rate limiting according to embodiments of the present disclosure.

FIG. 3 depicts an example 300 of queues for context-based rate limiting according to embodiments of the present disclosure.

Example 300 includes a source 305, which may be a VM 135 in FIG. 1, and a destination 315, which may be a different VM 135 of FIG. 1 or a destination on a separate host 105 of FIG. 1 from the host on which source 305 is located. In one example, source 305 is a client-side component and destination 315 is a server-side component of a client-server application. A plurality of request queues 310 are associated with source 305 and a plurality of response queues 360 are associated with destination 315. Request queues 310 and response queues 360 generally represent queues from which packets are sent, and include queues with different priorities.

Request queues 310 include a first priority queue 320, in which requests 322a-b have been placed. First priority queue 310 may have a highest priority of request queues 310, and requests 322a-b may be sent before requests in other response queues 310. Similarly, second priority queue 330 includes requests 332a-d, third priority queue 340 includes requests 342a-b, and fourth priority queue 350 includes requests 352a-d.

Response queues 360 include a first priority queue 370 with responses 372a-d, a second priority queue 380 with responses 382a-d, a third priority queue 390 with responses 392a-b, and a fourth priority queue 395 with responses 394a-d.

A first priority queue has priority over a second priority queue, a second priority queue has priority over a third priority queue, and a third priority queue has priority over a fourth priority queue. Requests or response in, for example, a third priority queue, are sent before requests or responses in a fourth priority queue. This priority scheme (e.g., queues corresponding to priorities 1-4 from which requests and responses are sent according to priority) is only included as an example, and other queue arrangements are possible for rate limiting requests and responses based on priority.

In one example, requests 322a-b were assigned a priority of 1 by rate limiting engine 172 of FIG. 1, and so were assigned to first priority queue 320 by MUX module 118 of FIG. 1. Responses will not necessarily be assigned the same priority as the requests to which they correspond. For example, responses 392a-b may correspond to requests 322a-b. A rate limiting engine on destination 315 may assign responses 392a-b a priority of 3 based on rate limiting policies, and responses 392a-b may be assigned to third priority queue 390 by a MUX module on destination 315.

In one embodiment, requests 352a-d are requests for video data, and correspond to responses 372a-d, which comprise the requested video data. Although requests 352*a-d* are smaller in size than responses 372*a-d*, requests 352*a-d* are assigned a low priority of 4 in order to rate limit responses 372*a-d*. Responses 372*a-d* are assigned a high priority of 1, and are promptly sent when the more heavily rate limited requests 352*a-d* are received at destination 315 in order to avoid buffering large amounts of video data. It is noted that video data is included as an example, and other types of data may also be requested.

Figure 4:
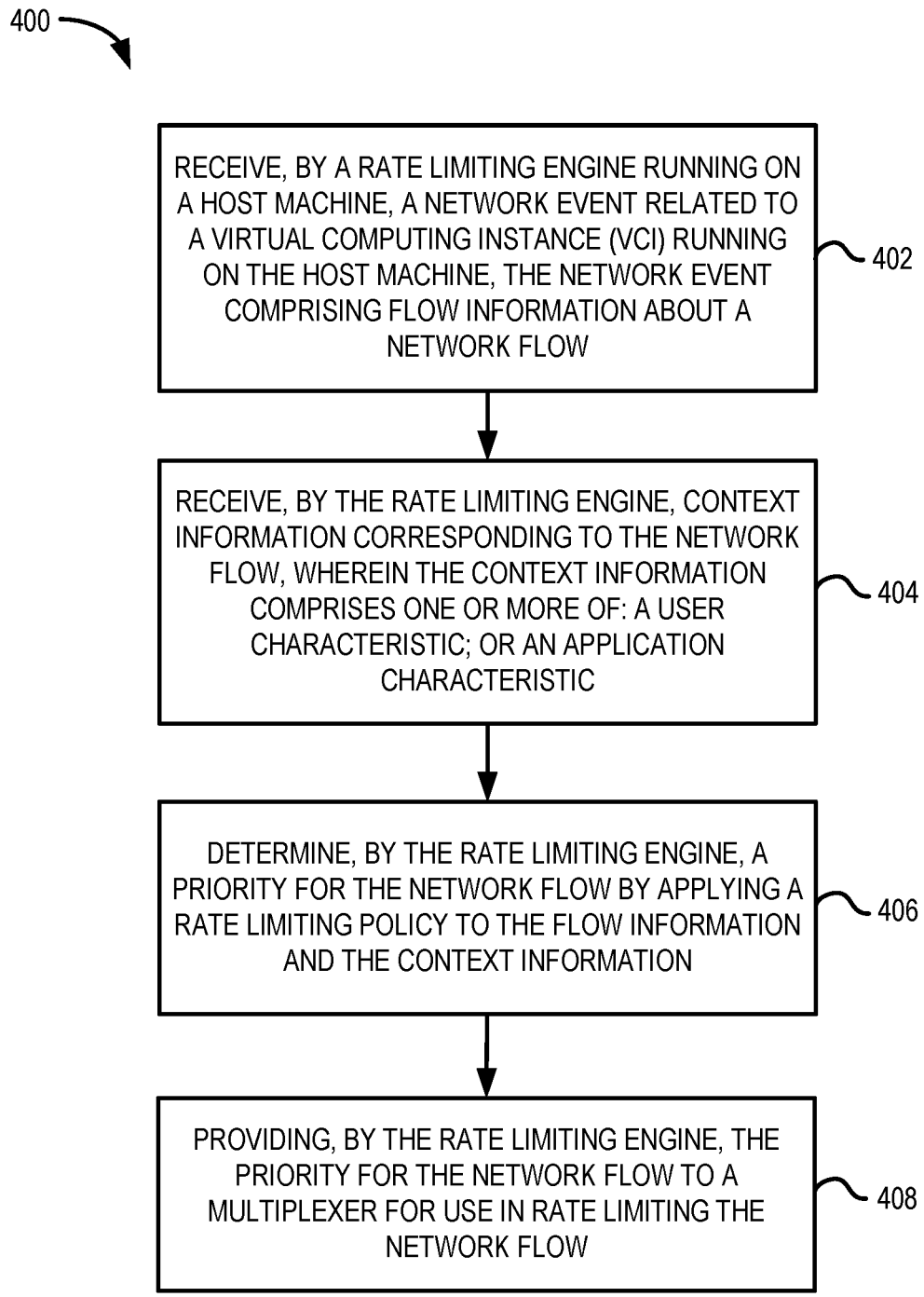
FIG. 4 depicts a flow diagram of a method of context-based rate limiting according to embodiments of the present disclosure.

FIG. 4 depicts a flow diagram of a method 400 of context-based rate limiting. In an example, method 400 is performed by rate limiting engine 172 of FIG. 1.

At step 402, a rate limiting engine running on a host machine receives a network event related to a virtual computing instance (VCI) running on the host machine, the network event comprising flow information about a network flow. In an example, rate limiting engine 172 of FIG. 1 receives the flow information from MUX module 118 of FIG. 1, which may have received the flow information from thin agent 164 of FIG. 1. In some embodiments, the flow information comprises a five-tuple identifier of the network flow. The network event may, for example, comprise a connect, pre-connect, or disconnect event. In some embodiments, the network event relates to a request for data or a response.

At step 404, the rate limiting engine receives context information corresponding to the network flow, wherein the context information comprises one or more of: a user characteristic; or an application characteristic. In an example, rate limiting engine 172 of FIG. 1 receives the context information from MUX module 118 of FIG. 1. The context information may have been provided by context engine 166 of FIG. 1 to thin agent 164 of FIG. 1, which may have provided the context information to MUX module 118 of FIG. 1.

At step 406, the rate limiting engine determines a priority for the network flow by applying a rate limiting policy to the flow information and the context information. In an embodiment, rate limiting engine 172 of FIG. 1 applies a rate limiting policy received from manager 138 of FIG. 1 via controller 136 of FIG. 1 to the flow information and context information in order to assign the priority to the network flow.

At step 408, the rate limiting engine provides the priority for the network flow to a multiplexer for use in rate limiting the network flow. In an embodiment, rate limiting engine 172 of FIG. 1 provides the priority for the network flow to MUX module 118 of FIG. 1, and MUX module 118 of FIG. 1 performs rate limiting for packets in the network flow based on the priority. In some embodiments, the multiplexer rate limits the network flow by assigning a packet of the network flow to a given queue of a plurality of queues based on the priority of the network flow.

In some embodiments, the network event comprises a request corresponding to the network flow, and rate limiting the network flow comprises delaying sending the request to an endpoint for a time based on the priority.

In some embodiments, determining the technique for rate limiting the network flow comprises determining based on the context information that the request is for content that is larger in size than the request.

Some embodiments further include receiving an indication from an endpoint corresponding to the network flow that the endpoint is congested and delaying sending requests in the network flow based on the indication.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of rate limiting packets in a network, comprising:
    receiving, by a rate limiting engine running on a host machine, a network event related to a virtual computing instance (VCI) running on the host machine, the network event comprising flow information about a network flow;
    receiving, by the rate limiting engine, context information corresponding to the network flow, wherein the context information comprises one or more of:
        a user characteristic; or
        an application characteristic;
    determining, by the rate limiting engine, a priority for the network flow by applying a rate limiting policy to the flow information and the context information; and
    providing, by the rate limiting engine, the priority for the network flow to a multiplexer for use in rate limiting the network flow, wherein the network event comprises a request corresponding to the network flow, and wherein the multiplexer rate limits the network flow by delaying sending the request to an endpoint for a time based on the priority.

2. The method of claim 1, wherein the multiplexer rate limits the network flow by assigning a packet of the network flow to a given queue of a plurality of queues based on the priority of the network flow.

3. The method of claim 1, wherein determining the priority for the network flow comprises determining based on the context information that the request is for content that is larger in size than the request.

4. The method of claim 1, wherein the request comprises a pre-connection request, and wherein delaying sending the request delays a connection corresponding to the pre-connect request.

5. The method of claim 1, wherein the context information comprises user group information, and wherein the rate limiting policy relates to the user group information.

6. The method of claim 1, further comprising receiving an indication from the endpoint corresponding to the network flow that the endpoint is congested, wherein the multiplexer delays sending requests in the network flow based on the indication.

7. A computer system, comprising:
    one or more processors; and
    a non-transitory computer readable medium comprising instruction that, when executed by the one or more processors, cause the computer system to perform a method of rate limiting packets in a network, the method comprising:
        receiving, by a rate limiting engine running on a host machine, a network event related to a virtual computing instance (VCI) running on the host machine, the network event comprising flow information about a network flow;
        receiving, by the rate limiting engine, context information corresponding to the network flow, wherein the context information comprises one or more of:
            a user characteristic; or
            an application characteristic;
        determining, by the rate limiting engine, a priority for the network flow by applying a rate limiting policy to the flow information and the context information; and
        providing, by the rate limiting engine, the priority for the network flow to a multiplexer for use in rate limiting the network flow, wherein the network event comprises a request corresponding to the network flow, and wherein the multiplexer rate limits the network flow by delaying sending the request to an endpoint for a time based on the priority.

8. The computer system of claim 7, wherein the multiplexer rate limits the network flow by assigning a packet of the network flow to a given queue of a plurality of queues based on the priority of the network flow.

9. The computer system of claim 7, wherein determining the priority for the network flow comprises determining based on the context information that the request is for content that is larger in size than the request.

10. The computer system of claim 7, wherein the request comprises a pre-connection request, and wherein delaying sending the request delays a connection corresponding to the pre-connect request.

11. The computer system of claim 7, wherein the context information comprises user group information, and wherein the rate limiting policy relates to the user group information.

12. The computer system of claim 7, wherein the method further comprises receiving an indication from the endpoint corresponding to the network flow that the endpoint is congested, wherein the multiplexer delays sending requests in the network flow based on the indication.

13. A non-transitory computer readable medium comprising instructions that, when executed by a processor of a computer system, cause the computer system to perform a method of rate limiting packets in a network, the method comprising:
- receiving, by a rate limiting engine running on a host machine, a network event related to a virtual computing instance (VCI) running on the host machine, the network event comprising flow information about a network flow;
- receiving, by the rate limiting engine, context information corresponding to the network flow, wherein the context information comprises one or more of:
  - a user characteristic; or
  - an application characteristic;
- determining, by the rate limiting engine, a priority for the network flow by applying a rate limiting policy to the flow information and the context information; and
- providing, by the rate limiting engine, the priority for the network flow to a multiplexer for use in rate limiting the network flow, wherein the network event comprises a request corresponding to the network flow, and wherein the multiplexer rate limits the network flow by delaying sending the request to an endpoint for a time based on the priority.

14. The non-transitory computer readable medium of claim 13, wherein the multiplexer rate limits the network flow by assigning a packet of the network flow to a given queue of a plurality of queues based on the priority of the network flow.

15. The non-transitory computer readable medium of claim 13, wherein determining the priority for the network flow comprises determining based on the context information that the request is for content that is larger in size than the request.

16. The non-transitory computer readable medium of claim 13, wherein the request comprises a pre-connection request, and wherein delaying sending the request delays a connection corresponding to the pre-connect request.

17. The non-transitory computer readable medium of claim 13, wherein the context information comprises user group information, and wherein the rate limiting policy relates to the user group information.

* * * * *